United States Patent [19]

Fukamachi

[11] Patent Number: 4,621,789
[45] Date of Patent: Nov. 11, 1986

[54] ELECTRICALLY DRIVEN VALVE

[76] Inventor: Rikuo Fukamachi, 1-44-10, 1-chome, Tezukayama, Nara City, Japan

[21] Appl. No.: 794,373

[22] Filed: Nov. 4, 1985

[51] Int. Cl.$^4$ .............................................. F16K 31/04
[52] U.S. Cl. .......................... 251/129.12; 251/129.11; 185/40 R; 185/43; 74/784
[58] Field of Search ...................... 251/129.11, 129.12; 185/40 R, 43; 74/781 R, 784

[56] References Cited

U.S. PATENT DOCUMENTS

| | | | |
|---|---|---|---|
| 2,738,033 | 3/1956 | Towle et al. | 185/40 R |
| 2,761,331 | 9/1956 | Buescher | 251/129.12 X |
| 3,011,754 | 12/1961 | Ander | 251/129.12 X |

Primary Examiner—Arnold Rosenthal
Attorney, Agent, or Firm—Wenderoth, Lind & Ponack

[57] ABSTRACT

The present invention generally relates to a valve and more particularly, to an electrically driven valve which is so arranged that, in the electrically driven valve adapted to selectively open or close the valve by rotating the valve body of said valve through driving by a reversible motor, there is incorporated a mechanism for automatically opening or closing the valve when it becomes impossible to control the valve for energization due to power failures, etc.

1 Claim, 3 Drawing Figures ial spring based on the functioning of a solenoid, simultaneously with occurrence of emergencies such as power failures and the like.

The present invention has been effected to accomplish these and other objects, and the specific arrangement thereof will be further clarified by the attached drawings and the detailed description thereof to be given hereinafter.

ELECTRICALLY DRIVEN VALVE

BACKGROUND OF THE INVENTION

Conventionally, there has been proposed an electrically driven valve arranged to selectively open or close the valve by rotating the valve body of the valve through driving by a motor, and the electrically driven valve of this kind is generally so constructed that, during stopping of the motor, a rotary shaft of the motor is fixed for non-rotation by a braking mechanism provided within the motor so that the valve body of the valve may not be rotated by the pressure of a fluid passing through a flow passage.

Accordingly, in the case where it becomes impossible to control the valve for opening and closing due to incapability of energization of the motor by power failure or some other troubles, the valve body of the valve remains in the state before the interruption of the energization, and therefore, when the energization becomes impossible, with the valve body left in the opened state, there has been such a danger that a tank may be overflowed. Accordingly, it has been a conventional practice that an operator manually closes the valve simultaneously as the trouble takes place, but this practice is not fully satisfactory from the viewpoint of security, since it is almost impossible to control a plurality of valves in a short time, thus resulting in some valves undesirably left unclosed.

In order to overcome the above disadvantage, there has also been devised an arrangement which is adapted to automatically close the valve by the change-over with an electro-magnetic clutch through utilization of a restoring force of a spiral spring preliminarily wound manually. The above known arrangement, however, not only requires the troublesome procedure for manually winding the spiral spring in advance, but also involves a possibility of carelessly leaving the spiral spring unwound, and furthermore, owing to the necessity for employing the expensive electro-magnetic clutch, there is such a drawback that the manufacturing unit cost becomes extremely high, and thus, the arrangement has not been put into actual applications as yet.

SUMMARY OF THE INVENTION

Accordingly, a primary object of the present invention is to provide an improved electrically driven valve which is favorable in operability, without requiring manual operations, through substantial elimination of disadvantages inherent in the conventional electrically driven valves of this type.

A second object of the present invention is to provide an electrically driven valve of the above described type which is capable of automatically opening or closing the valve by a restoring force of a spiral spring during power failures, etc., without requiring clutch operation.

A third object of the present invention is to provide an electrically driven valve of the above described type which is so arranged that a motor for driving the valve body of the valve is utilized for winding the spiral spring, whereby the open/close control of the valve and the winding of the spiral spring may be effected by one motor.

A fourth object of the present invention is to provide an electrically driven valve of the above described type which is capable of preventing unexpected accidents by opening or closing the valve through rewinding of the spiral spring based on the functioning of a solenoid, simultaneously with occurrence of emergencies such as power failures and the like.

The present invention has been effected to accomplish these and other objects, and the specific arrangement thereof will be further clarified by the attached drawings and the detailed description thereof to be given hereinafter.

DETAILED DESCRIPTION OF THE INVENTION

Figure 1:
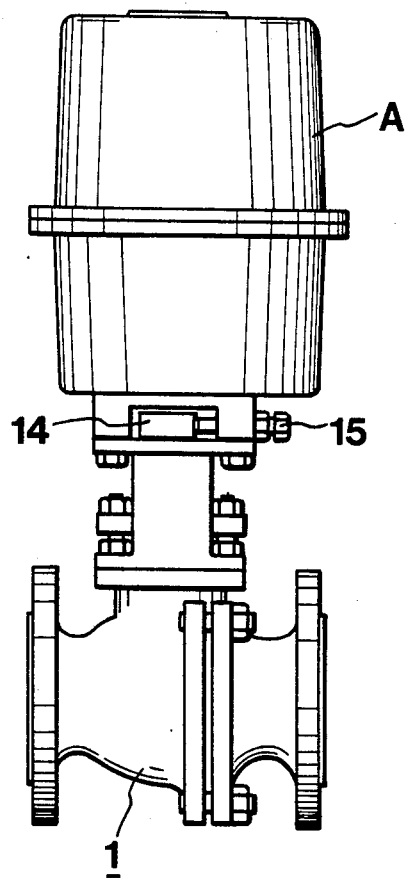
FIG. 1 is a side elevational view showing a general appearance of an electrically driven valve according to one preferred embodiment of the present invention.

An electrically driven valve according to the present invention is so arranged that, in the electrically driven valve adapted to selectively open or close the valve 1 by rotating an output shaft 2 connected to a rotary shaft of the valve body of said valve 1, for 90° in the forward or reverse direction through driving by a reversible motor 3, an internal gear 4 arranged to rotate independently of the output shaft 2 through rotation of the motor 3 is rotatably supported by said output shaft 2, and a shaft 8 on which a gear 5 engaged with inner peripheral teeth $4_1 \ldots 4_1$ of said internal gear 4 and a gear 7 in mesh with a gear 6 rotatably supported by said output shaft 2 and rotated irrelevant to said output shaft are fixed at its opposite ends, is rotatably extended through a bore $9_1$ formed at part of a crank 9 integrally fixed to the output shaft 2, while a spiral spring 10 to be wound by the rotation of said gear 6 in one direction is provided, together with a ratchet mechanism 11 for preventing reverse rotation of said spiral spring and a solenoid 12 for releasing the stopping function of said ratchet mechanism.

It is to be noted here that the spiral spring 10 has its inner end piece fitted in a slit formed in a shaft $10_2$ integral with a gear $10_1$ in mesh with the gear 6, and its outer end piece fixed to part of a casing A secured to a flange portion of the valve 1 for covering the entire valve unit so as to be wound by the rotation of the gear 6, and said spiral spring may be provided in plurality in number depending on necessity to increase the restoring force.

Figure 2:
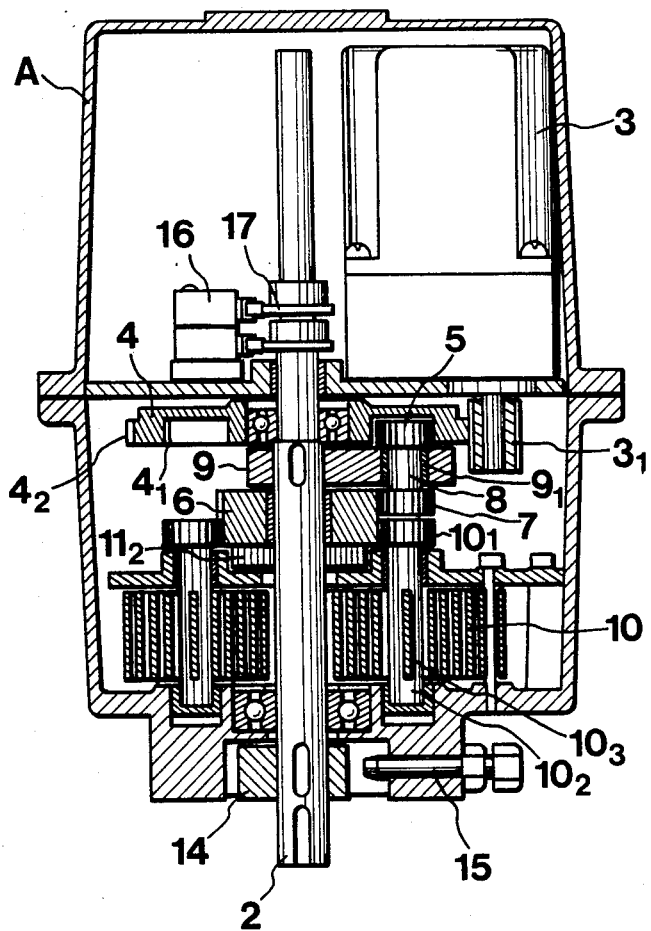
FIG. 2 is a longitudinal side sectional view of a driving section for rotating a rotary shaft of a valve body of the valve of FIG. 1.
Figure 3:
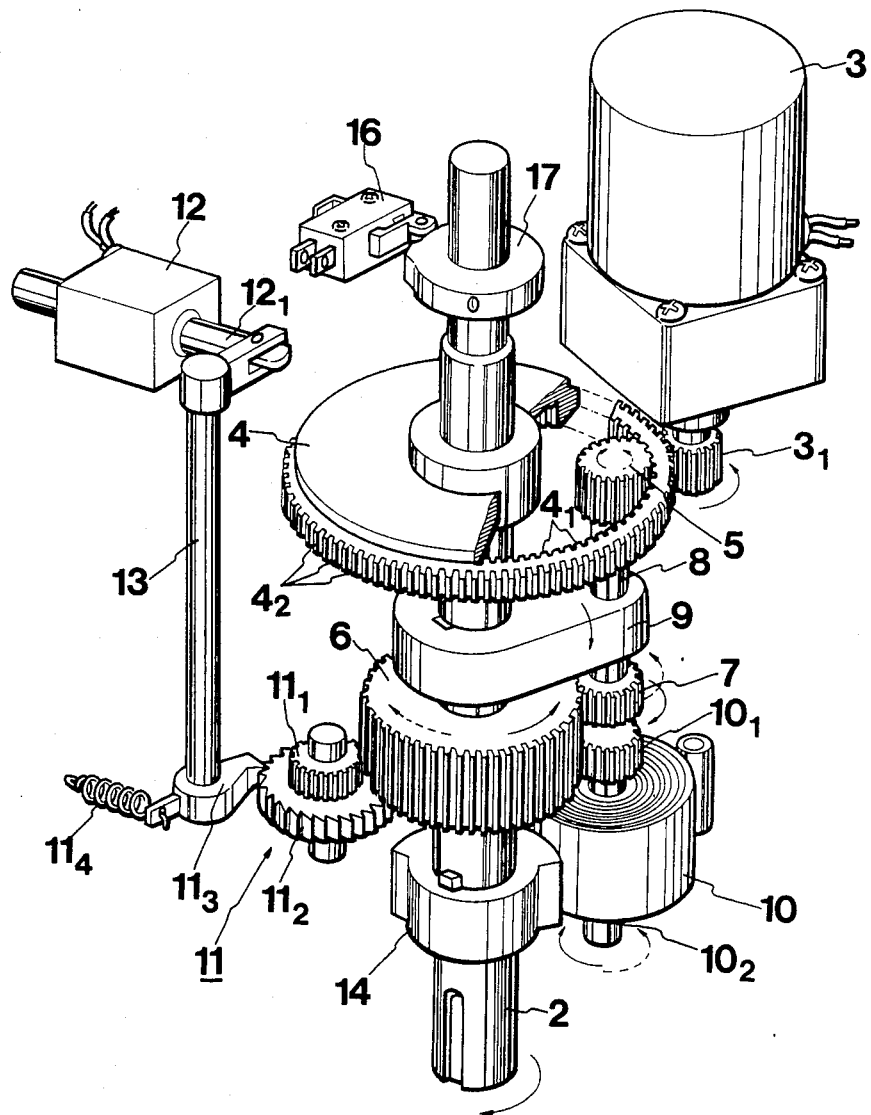
FIG. 3 is a perspective view showing an entire construction of said driving section.

Meanwhile, the ratchet mechanism 11 includes a ratchet gear $11_2$ integral with a gear $11_1$ engaged with said gear 6, a ratchet pawl $11_3$ engaged with the gear $11_2$, and a spring $11_4$ for normally urging the ratchet pawl $11_3$ in a direction for engagement with the ratchet gear $11_2$. The ratchet pawl $11_3$ is arranged to be rotated in the engagement releasing direction through a rotary shaft 13 by retreatment of an extended end of a plunger $12_1$ of a solenoid 12. The lower end of the output shaft 2 is fitted in a hole formed at the upper end of the rotary shaft (not shown) of the valve body of the valve 1 so that the rotary shaft of the valve body is rotated as one unit through rotation of the output shaft 2, thereby to make it possible to rotate within a range of 90° in the forward or reverse direction by a cam 14 secured in the vicinity of the lower end of the output shaft 2 and a stopper 15 directed inwardly from the outer side at the lower end of the casing A. As shown in FIGS. 2 and 3, there is provided a limit switch 16 which senses the rotation of the output shaft 2 and transmits electrical signals indicating whether the valve 1 is opened or closed. The limit switch 16 has its contacts turned on or off by a cam plate 17 integrally fixed to the output shaft 2. There is further provided a gear $3_1$ integral with the rotary shaft of the motor 3, and in mesh with outer peripheral teeth $4_2 \ldots 4_2$ of the internal gear 4 so as to rotate the internal gear 4 through rotation by the motor 3 for constituting a reduction mechanism thereby.

Subsequently, according to the arrangement of the present invention described so far, specific uses, functions and effects of the electrically driven valve of the invention will be described based on the embodiment as illustrated, with reference to the case where the valve is to be closed during a power failure.

Specifically, under the energized state in which the valve 1 may be controlled by the motor 3, current is passed through the exciting coil of the solenoid 12 at all times, and since the extended end of its plunger $12_1$ is projecting, the ratchet pawl $11_3$ engages the ratchet gear $11_2$, and thus, the ratchet gear $11_2$, i.e., the gear 6 is in the state where it is allowed to rotate only in one direction. In the above state, upon driving of the motor 3 in such a manner that it is rotated in the direction to close the valve body of the valve 1, the internal gear 4 is rotated in the direction indicated by the solid line arrow through rotation of the gear $3_1$ integral with said rotary shaft, and the integral gear 7 is rotated in the direction of the solid line arrow through the gear 5 in mesh with the inner peripheral teeth $4_1 \ldots 4_1$ and the shaft 8, and therefore, the gear 6 engaged with the gear 7 and the gear $10_1$ are also rotated in one unit so as to start the winding of the spiral spring 10. As the spiral spring 10 is wound, the restoring force thereof is increased, with an increase of the torque of the gear $10_1$, i.e. the torque of the gear 6, and then, the gear 7 engaged with said gear effects the so-called plannetary motion, by revolving around the gear 7 while rotating in itself. Therefore, the crank 9 as depressed by the shaft 8 integral with the gear 7 is pivoted in the direction of the solid line arrow, with simultaneous rotation of the output shaft 2 integral therewith, and consequently, the valve body of the valve 1 is to be rotated in the direction for closing. Upon closing of the valve body by the above rotation, any further rotation is prevented by the function of the stopper 15, and simultaneously, the current feeding to the motor 3 is interrupted by the action of the limit switch 16 to stop the motor 3. However, when the current is further fed to the motor 3, with the contacts of another switch connected in parallel to the above limit switch 16 being closed, since the output shaft 2 is in the fixed state not rotatable in the closing direction any further, the gear 5, i.e. the gear 7 is again rotated through rotation of the gear $3_1$ for the motor 3, i.e. through rotation of the internal gear 4 so as to turn the gear 6, and thus, the spiral spring 10 is further wound. When the motor 3 is stopped by de-energizing the motor 3 at the time point where the spiral spring has been fully wound, said spiral spring 10 is held as it is in the pressure-accumulated state, since the rewinding of the spiral spring 10 is prevented by the ratchet mechanism 11.

In the above pressure-accumulated state, the gear 6 is held to be fixed, and therefore, when the current is fed to the motor 3 in the reverse direction to the above for reverse rotation of the gear $3_1$, the internal gear 4 and the gears 5 and 7 are rotated in the reverse direction, and the gear 7 is subjected to the planetary motion in the reverse direction to that previously stated, thereby causing the crank 9 to pivot in the reverse direction, and thus, the output shaft 2 is rotated through 90° to open the valve body 1 of the valve 1. Simultaneously with the opening of the valve body, the current feeding to the motor 3 is interrupted by the function of the limit switch 16 and consequently, the motor 3 is stopped. Thereafter, the earlier stated function is repeated through driving by the motor 3 for the open/close control of the valve 1.

Accordingly, in the open state of the valve 1, when a trouble such as power failure, etc. in which the current feeding control to the motor 3 can not be effected, should take place, the energization of the solenoid 12 is of course suspended, and therefore, the extended end of the plunger $12_1$ attracted to the exciting coil is retreated by a storing force of a powerful spring provided within the solenoid so as to release the engagement of the ratchet pawl $11_3$ with the ratchet gear $11_2$ by pivoting said pawl $11_3$ in the direction of the solid line arrow for bringing the gear 6 into a free state. When the gear 6 is set in the free state, it is rotated in the direction opposite to that for winding the spiral 10 by the restoring force, or rewinding force of said spring 10, i.e. in the direction indicated by the dotted line arrow, and therefore, the gears 7 and 5 engaged therewith are also rotated in the direction of the dotted line arrow. However, in the stopped state of the motor 3, since the rotary shaft of the motor 3, i.e. the gear $3_1$ is held in the fixed state as stated previously, with the internal gear 4 being also held in the fixed state, the gear 5 is subjected to rolling motion while being engaged with the inner peripheral teeth $4 \ldots 4$, and the crank 9 i.e. the output shaft 2 as depressed by the shaft 8 is rotated in the direction indicated by the solid line arrow, i.e. in the closing direction of the valve 1 earlier described for automatic closing of the valve body. If it is so arranged that, when the shaft $10_2$ for winding the spiral spring 10 is rotated in the rewinding direction, this is detected to produce a signal, it becomes possible by this signal to indicate that the winding is necessary for the spiral spring after re-starting of the energization, or to automatically effect the winding operation for the spiral spring by the motor 3 after resumption of the energization.

As is clear from the foregoing description, according to the electrically driven valve of the present invention, since the arrangement is so made that the spiral spring is wound through utilization of the motor for effecting the open/close control of the valve, whereby when it becomes impossible to effect the current feeding control for the motor during power failure, etc., said spiral spring is rewound so as to selectively close or open the valve body of said valve, neither a troublesome procedure for manually winding the spiral spring nor an expensive electro-magnetic clutch, is necessary, and thus, an improved electrically driven valve incorporated with the emergency open/close device may be presented at extremely low cost.

It should be noted here that, according to the foregoing embodiment, description has been made with reference to the case where the valve is closed at emergencies such as power failures, etc., but in the case where the valve must be opened when the current feeding control is impossible as in the power failure and the line, for example, in the case where the valve is to be applied to valves for sprinklers, etc., the fixing position of the cam for the stopper may be so altered as to wind the spiral spring during opening of the valve.

What is claimed is:

1. In an electrically driven valve arranged to selectively open or close a valve 1 by rotating an output shaft 2 connected to a rotary shaft of a valve body of said valve 1 through 90° in a forward or reverse direction based on driving by a reversible motor 3, the improvement comprising an internal gear 4 rotatably provided on said output shaft 2 for rotation independently of the output shaft 2 through rotation of the motor 3, a gear 5 in mesh with inner peripheral teeth $4_1 \ldots 4_1$ of said internal gear 4 and a gear 6 rotatably supported by said output shaft 2 and arranged to be rotated independently of said output shaft, a shaft 8 having said gears 5 and 7 fixed at opposite ends thereof, a crank 9 integrally fixed to said output shaft 2, said shaft 8 being rotatably extended through a bore 9 formed at part of said crank 9, a spiral spring 10 adapted to be wound through rotation of said gear 6 in one direction, a ratchet mechanism 11 for preventing said spiral spring from reverse rotation, and a solenoid 12 for releasing the stopping function of said ratchet mechanism.

* * * * *